US010525960B2

(12) United States Patent
Gerber et al.

(10) Patent No.: US 10,525,960 B2
(45) Date of Patent: Jan. 7, 2020

(54) BRAKING MECHANISM COMPRISING A WORKING FLUID RECEPTACLE

(71) Applicant: Continental Teves AG & Co. oHG, Frankfurt (DE)

(72) Inventors: Sascha Gerber, Bad Schwalbach (DE); Stephan Krebs, Eschborn (DE); Horst Krämer, Ginsheim-Gustavsburg (DE); Harald König, Ober-Mörlen (DE); Christoph Schiel, Bad Nauheim (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 57 days.

(21) Appl. No.: 15/560,343

(22) PCT Filed: Mar. 15, 2016

(86) PCT No.: PCT/EP2016/055552
§ 371 (c)(1),
(2) Date: Sep. 21, 2017

(87) PCT Pub. No.: WO2016/156029
PCT Pub. Date: Oct. 6, 2016

(65) Prior Publication Data
US 2018/0072294 A1 Mar. 15, 2018

(30) Foreign Application Priority Data
Apr. 1, 2015 (DE) .................. 10 2015 205 938

(51) Int. Cl.
*B60T 17/06* (2006.01)
*B60T 11/16* (2006.01)
*B60T 11/26* (2006.01)

(52) U.S. Cl.
CPC ............. *B60T 17/06* (2013.01); *B60T 11/16* (2013.01); *B60T 11/26* (2013.01)

(58) Field of Classification Search
CPC ................................. B60T 11/26; B60T 17/06
(Continued)

(56) References Cited

U.S. PATENT DOCUMENTS

| 4,989,498 A | 2/1991 | Mori et al. |
| 6,203,022 B1 | 3/2001 | Struschka et al. |
| 7,152,406 B2 | 12/2006 | von Hayn et al. |

FOREIGN PATENT DOCUMENTS

| DE | 19615157 A1 | 10/1997 |
| DE | 10108610 A1 | 9/2002 |

(Continued)

OTHER PUBLICATIONS

Notification of Reasons for Refusal for Japanese Application No. 2017-551060, dated Sep. 14, 2018, with translation, 12 pages.

(Continued)

*Primary Examiner* — Michael Leslie
*Assistant Examiner* — Daniel S Collins
(74) *Attorney, Agent, or Firm* — RatnerPrestia

(57) ABSTRACT

A brake unit having a container which serves for accommodating working fluid and which is arranged with at least one connector piece in a receiving bore and which is sealed off by a sealing element which extends radially around the connector piece. In order to offer a simple, inexpensive and pressure-tight interface between connector piece in a receiving bore, it is proposed that a form fit transversely with respect to the direction of the longitudinal axis of the connector piece is formed by a displacement of the material of the sealing element during the installation of the connector piece in the receiving bore.

11 Claims, 3 Drawing Sheets

(58) Field of Classification Search
USPC .......................................................... 454/237
See application file for complete search history.

(56) References Cited

FOREIGN PATENT DOCUMENTS

| | | |
|---|---|---|
| JP | 2007057091 A | 3/2007 |
| JP | 2007147084 A | 6/2007 |
| KR | 20050031465 A | 4/2005 |

OTHER PUBLICATIONS

Korean Office Action for Korean Application No. 10-2017-7026930, dated Oct. 24, 2018, with translation, 12 pages.
International Search Report and Written Opinion for International Application No. PCT/EP2016/055552, dated Jun. 14, 2016, 8 pages.
German Search Report for German Application No. 10 2015 205 938.3, dated Oct. 29, 2015, including partial English translation, 8 pages.

BRAKING MECHANISM COMPRISING A WORKING FLUID RECEPTACLE

CROSS REFERENCE TO RELATED APPLICATIONS

This application is the U.S. National Phase Application of PCT/EP2016/055552, filed Mar. 15, 2016, which claims priority to German Patent Application No. 10 2015 205 938.3, filed Apr. 1, 2015, the contents of such applications being incorporated by reference herein.

FIELD OF THE INVENTION

The invention relates to a brake unit which is used in particular for a hydraulic motor vehicle brake system.

BACKGROUND OF THE INVENTION

Brake units of said type are very widely used and have a container for working fluid, which container is inserted with a connector piece into a receiving bore in a master brake cylinder, in particular a tandem master brake cylinder or in a separate connector line, and is sealed off or even fixed by means of an elastic sealing element.

The initial filling of brake systems with working fluid is normally performed in automated fashion under high fill pressures (often >6 bar). Said pressure can result in leakages because the sealing element deforms or is forced out of its intended seat.

To prevent this, it is for example known for the sealing element to be equipped with radially encircling collars which engage into an encircling groove in the side wall of the receiving bore (or vice versa) and thus form an undercut which counteracts the axial displacement of the sealing element.

Production of such solutions is however complex and expensive. The installation process is also susceptible to errors because the undercut opposes straightforward handling during the installation process, and correct positioning of the collar in the groove must be ensured and checked.

SUMMARY OF THE INVENTION

An aspect of the present invention is an improved brake unit in the case of which the pressure-tight interface between the connector piece and the receiving bore is realized in a simpler and less expensive manner.

Here, the form fit acts in a radial direction and is compulsorily generated for the first time as a result of the installation of the container or of the connector piece in the receiving bore.

A form fit of said type is effective in preventing the sealing element from sliding off and creeping in the radial direction, and thereby counteracts both a displacement of the sealing element out of the gap between the connector piece and the receiving bore.

The advantageous refinement provides a projection which compulsorily penetrates axially into the sealing element during the installation of the container such that the material of the sealing element is laterally displaced and a form fit is formed as a result of the displacement.

For a form fit of said type, there is no need for special shaping of the sealing element, which would hitherto have had to have an undercut in its construction. Inexpensive, collarless sealing elements can be used without functional disadvantages. The structural height for the interface, and as a result the material usage, weight and costs, can be reduced.

In a particularly advantageous refinement, symmetrical designs or even simple hollow cylinders can be used as sealing elements, which can be installed either way round and do not need to be aligned in a correct position during the installation process.

An omission of the undercut on the wall of the connector bore leads to further cost savings owing to simpler production tools and processes and the reduced cycle time.

The installation of the sealing element even by hand is considerably simplified, and the sealing element or the connector piece do not need to be latched in. The dismounting process is non-destructive.

Owing to the additional axial compression and lateral displacement of the material of the sealing element at the form fit, the contact pressure in the radial direction is also increased, which yields an additional improvement in the sealing action. Furthermore, play-free axial fixing of the sealing element is made possible in a particularly simple manner.

Here, the form fit may be provided either on one side, in the region of the container base or of the bore base of the connector bore, or at both sides, and thus double its effectiveness.

In the advantageous refinement of the invention, the tip of the cross-sectional profile of the projection is provided so as to be narrower than the base thereof, such that the cross-sectional profile of the projection is of wedge-shaped, in particular trapezoidal or triangular design. In this way, the lateral displacement of the material of the sealing element is promoted, whereby a lower pressing force is required, and the risk of damage to the sealing element is reduced.

In one embodiment according to the invention, the projection may be formed as an axially protruding, encircling profile concentric with respect to the longitudinal axis of the connector piece, whereby said projection can be produced particularly inexpensively and using relatively simple tools.

In another embodiment according to the invention, multiple individual projections may be distributed along a circular path concentric with respect to the longitudinal axis of the connector piece, whereby the required pressing force is yet further reduced and a rotation of the sealing element about the connector piece is prevented.

In various embodiments according to the invention, the projection may either be integrated in the container or may be formed in the receiving bore or on a separate insert part which is placed between the sealing element and the container or the receiving bore during the installation process.

In this way, it is for example possible for existing brake systems to be inexpensively retrofitted, or for different design variants to be marketed at low cost.

BRIEF DESCRIPTIONS OF THE FIGURES

The invention will be discussed in more detail below on the basis of figures, in which:

FIG. 1

DETAILED DESCRIPTION OF THE PREFERRED EMBODIMENTS

Figure 1:
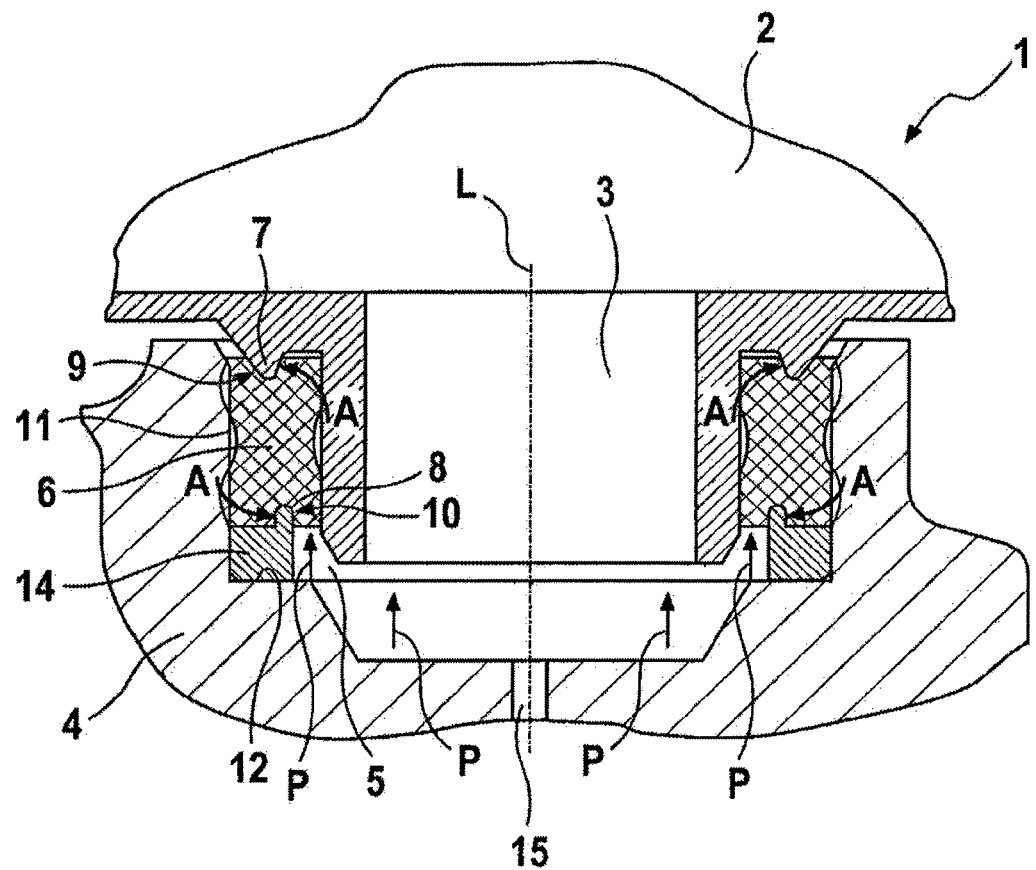
FIG. 1 shows a cross section through a connector piece and a receiving bore of a first embodiment according to an aspect of the invention of the brake unit.

FIG. 1 shows a first exemplary embodiment according to the invention in a sectional illustration. The container 2 has a connector piece 3 which is inserted into the receiving bore 5 in a master brake cylinder 4. In certain applications that are not shown here, the receiving bore 5 may be arranged not only directly in a master brake cylinder 4 but also spaced apart therefrom, for example in an extension line. In such embodiments, the exemplary embodiments described below may, within the invention, apply to both interfaces—both between the container and the extension and between the extension and the master brake cylinder 4.

The container is filled with a working fluid which passes into the master brake cylinder 4 via a duct 15 which opens into the receiving bore 5. A sealing element 6 serves for sealing off the interface, which sealing element extends radially around the connector piece 3 and is clamped between said connector piece and the side wall 11 of the receiving bore 5. In the exemplary embodiment shown, the sealing element 6 is of axially symmetrical, substantially ring-shaped form or is formed as a hollow cylinder.

During normal operation, the working fluid in the container 2 is at atmospheric pressure. However, during rapid automated initial filling of the brake system at the factory, a positive pressure of >6 bar may be generated in the brake system. The positive pressure causes the sealing element 6 to be loaded with a pressure force P. The pressure force P gives rise to various bending moments A in the sealing element 6, which bending moments can lead to a deformation of the sealing element 6, or even to the sealing element 6 being pushed, out of its intended seat—so-called "detachment". Leakages occur as a result.

To prevent this, an encircling projection 7 is formed on the container 2, which projection is arranged concentrically with respect to the connector piece 3 and extends in the direction of the master brake cylinder 4, axially parallel with respect to the longitudinal axis L of the connector piece 3.

During the installation of the container 2, it is firstly the case that the sealing element 6 is placed in the receiving bore 5. During the subsequent insertion of the connector piece 3, the projection 7 penetrates into the upper axial face surface of the elastic sealing element 6 and displaces the material thereof laterally. This compulsorily gives rise to a form fit 9, which counteracts the bending moment A in the radial direction and thus prevents the sealing element 6 from sliding on the container 2—the projection 7 digs into the sealing element 6.

On an inwardly projecting step 12 of the receiving bore 5 there is placed an insert part 14 which has a further concentric encircling projection 8. The projection 8 extends in the direction of the container 2, penetrates into the sealing element 6 through the lower axial face surface, and otherwise acts analogously to the above-described projection 7.

The lateral displacement of the material of the sealing element 6 by the projections 7 and 8 gives rise not only to the digging-in effect of the form fits 9 and 10 but also to a local cross-sectional widening of the sealing element 6, and thus to an increased contact pressure and an improved sealing effect.

FIG. 2

Figure 2:
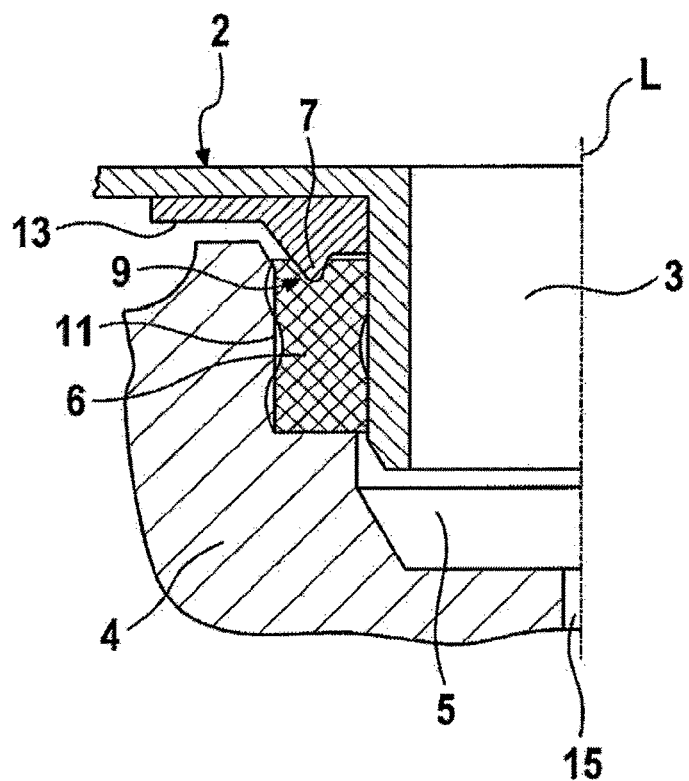
FIGS. 2 and 3 show cross-sectional illustrations of other embodiments according to aspects of the invention.
Figure 3:
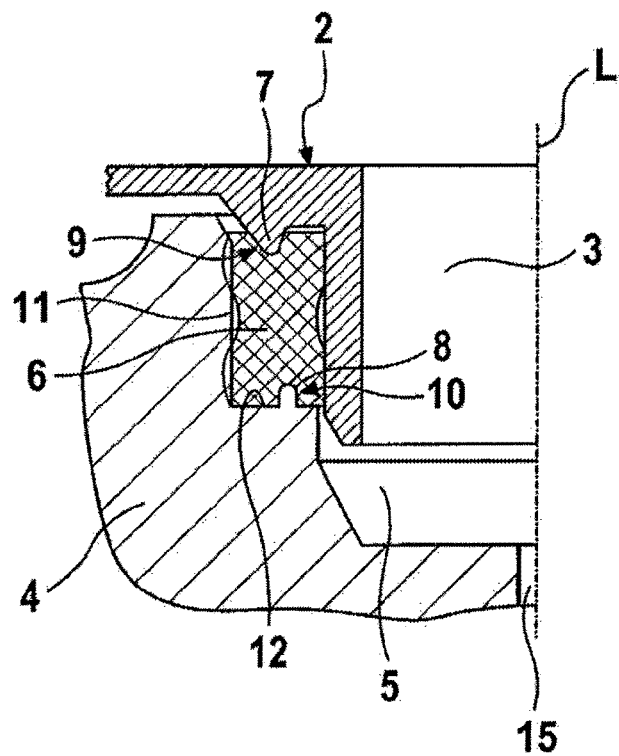

FIG. 2 shows a further embodiment according to an aspect of the invention in a sectional illustration. By contrast to the embodiment as per FIG. 1, the projection 7 is formed not directly on the container 2 but rather on a separate insert part 13. Here, the insert part 13 is pushed over the connector piece 3 and is clamped axially between the container 2 and the sealing element 6. The functioning of the projection 7 remains the same as that described above.

FIG. 3

In a further embodiment according to an aspect of the invention, the projection 7 is formed, as in FIG. 1, directly on the container 2, but the receiving-bore-side projection 8 is formed not on an insert part 14 but rather directly on the step 12 of the receiving bore 5.

FIG. 4

FIGS. 4 to 7 show insert parts 13 which are equipped with different embodiments of projections 7. All of the embodiments of projections according to aspects of the invention may, within the invention, also be formed integrally on the container 2 or in the receiving bore 5.

Figure 4:
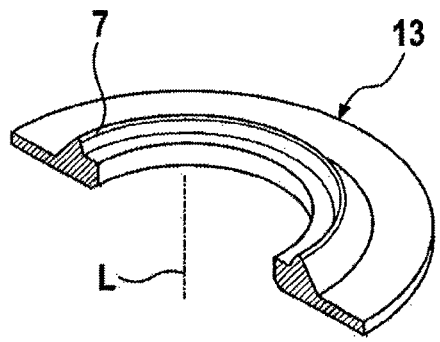
FIGS. 4-7 show different embodiments according to aspects of the invention of insert parts with different projections.

Accordingly, in the embodiment as per FIG. 4, the projection 7 is formed by an axially protruding, encircling trapezoidal profile concentric with respect to the longitudinal axis L. Because the tip of the profile is much narrower than the base thereof, the projection, owing to its wedge shape, poses less resistance during the penetration into the sealing element 6.

Figure 5:
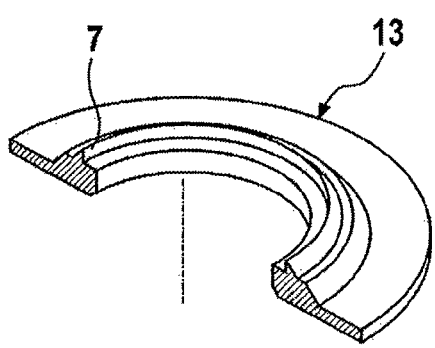

The embodiment as per FIG. 5 represents a variant of the embodiment as per FIG. 4, but with a triangular rather than trapezoidal profile.

Figure 6:
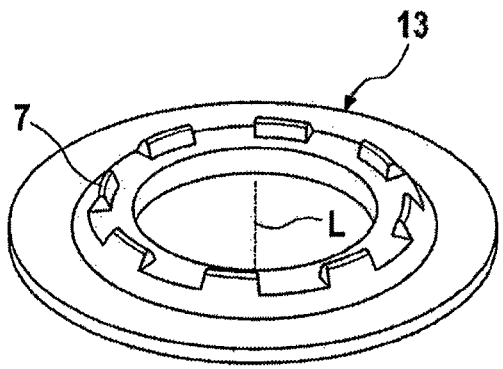
Figure 7:
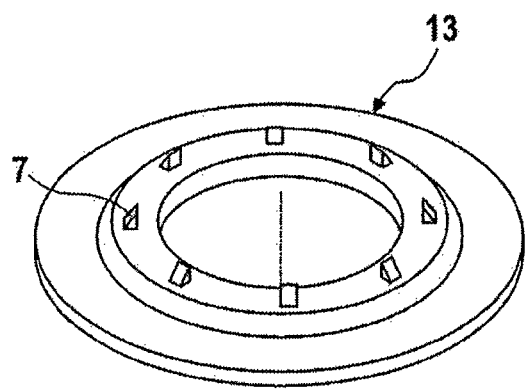

FIGS. 6 and 7 show further embodiments according to the invention, in which multiple individual projections 7 are arranged spaced apart from one another along a circular path which runs concentrically with respect to the longitudinal axis L. The interruptions between the individual projections 7 further reduce the resistance during the penetration into the sealing element 6, and furthermore prevent a possible rotation of the sealing element 6 about the longitudinal axis L. Projections designed in this way may also, within the invention, be of pin-like form.

LIST OF REFERENCE DESIGNATIONS

1 Brake unit
2 Container
3 Connector piece
4 Master brake cylinder
5 Receiving bore
6 Sealing element
7 Projection
8 Projection
9 Form fit
10 Form fit
11 Side wall
12 Step
13 Insert part
14 Insert part
15 Duct
A Bending moment
L Longitudinal axis
P Pressure force

The invention claimed is:

1. A brake unit for a hydraulic vehicle brake system, having a container for accommodating working fluid and which has at least one connector piece which is arranged in a receiving bore for exchanging the working fluid with a master brake cylinder, wherein a sealing element radially surrounds the connector piece at least in regions and is clamped between the connector piece and a side wall of the receiving bore wherein a form fit transversely with respect to the direction of a longitudinal axis of the connector piece is formed by a displacement of material of the sealing element during installation of the connector piece in the receiving bore, wherein a projection is provided which penetrates axially into the sealing element such that the material of the sealing element is laterally displaced and the form fit is formed transversely with respect to the direction of the longitudinal axis as a result of the displacement, the projection having a cross-sectional shape comprising a wedge-shape.

2. The brake unit as claimed in claim 1, wherein the projection is formed so as to be wider at its base than at its tip.

3. The brake unit as claimed in claim 1, wherein the projection is formed as an axially protruding, encircling profile concentric with respect to the longitudinal axis of the connector piece.

4. The brake unit as claimed in claim 1, wherein multiple individual projections are distributed along a circular path concentric with respect to the longitudinal axis of the connector piece.

5. The brake unit as claimed in claim 1, wherein the projection is formed on a container base.

6. The brake unit as claimed in claim 1, wherein the projection is formed on an insert part which is arranged between the container and the sealing element.

7. The brake unit as claimed in claim 1, wherein the projection is arranged on a step in the side wall or on a base of the receiving bore and extends in the direction of the container.

8. A brake unit for a hydraulic vehicle brake system, having a container for accommodating working fluid and which has at least one connector piece which is arranged in a receiving bore for exchanging the working fluid with a master brake cylinder, wherein a sealing element radially surrounds the connector piece at least in regions and is clamped between the connector piece and a side wall of the receiving bore wherein a form fit transversely with respect to the direction of a longitudinal axis of the connector piece is formed by a displacement of material of the sealing element during installation of the connector piece in the receiving bore, wherein a projection is provided which penetrates axially into the sealing element such that the material of the sealing element is laterally displaced and the form fit is formed as a result of the displacement, and wherein the projection is formed on an insert part which is placed in the receiving bore between the master brake cylinder and the sealing element.

9. The brake unit as claimed in claim 1, wherein the sealing element is arranged entirely within the receiving bore.

10. The brake unit as claimed in claim 9, wherein the sealing element is of axially symmetrical form.

11. The brake unit as claimed in claim 1, wherein the cross-sectional shape of the projection is selected from the group consisting of a trapezoidal shape and a triangular shape.

* * * * *